United States Patent Office 3,042,252
Patented July 3, 1962

3,042,252
FEEDING MECHANISM FOR AUTOMATIC LATHES
Leon Konrad, Rte. Principale 52, Evilard, Switzerland
Filed Nov. 5, 1959, Ser. No. 851,196
Claims priority, application Switzerland Nov. 6, 1958
10 Claims. (Cl. 221—81)

This invention relates to feeding mechanisms for automatic lathes and in particular to feeding mechanisms for lathes wherewith series of identical pieces are worked at the end of a stock bar driven in rotation by a head stock.

Feeding mechanisms for lathes of this type comprising a guiding device constituted by a revolver drum carrying a stock of bars are already known in the art. Some of these known mechanisms comprise: driving means with pushers to urge successively each stock bar of said drum through the head stock of the lathe; an endless chain always driven in the same direction, and coupling means connecting said endless chain to the pusher of the bar on which the lathe is working.

In the feeding mechanisms of the type indicated above known in the art the means provided for rotating the drum when one stock bar has been worked out and when the next one has to be brought in working position are rather cumbersome.

It is therefore an object of the invention to provide a feeding mechanism of the type indicated above in which the drum carrying the stock bars is moved round its axis step by step by means which are as simple as possible regarding their manufacturing operations as well as their use.

It is in particular an object of this invention to drive the drum around its axis by means of a weight and to hold this drum in its several working positions by means of an escapement comprising a lever arranged so that every oscillation of said lever permits the drum of moving one step forward around its axis under the action of said weight.

Another particular object of this invention is to actuate said lever by means of a member fixed to the endless chain actuating said pushers so that this lever is actuated once at every complete revolution of said chain.

It is still another particular object of this invention to actuate said escapement lever by means of the coupling means provided between said endless chain and said pushers.

Still further objects of the invention will become apparent in the course of the following description.

One embodiment of the feeding mechanism according to the invention is represented diagrammatically and by way of example in the drawings annexed to this specification.

Figure 1:
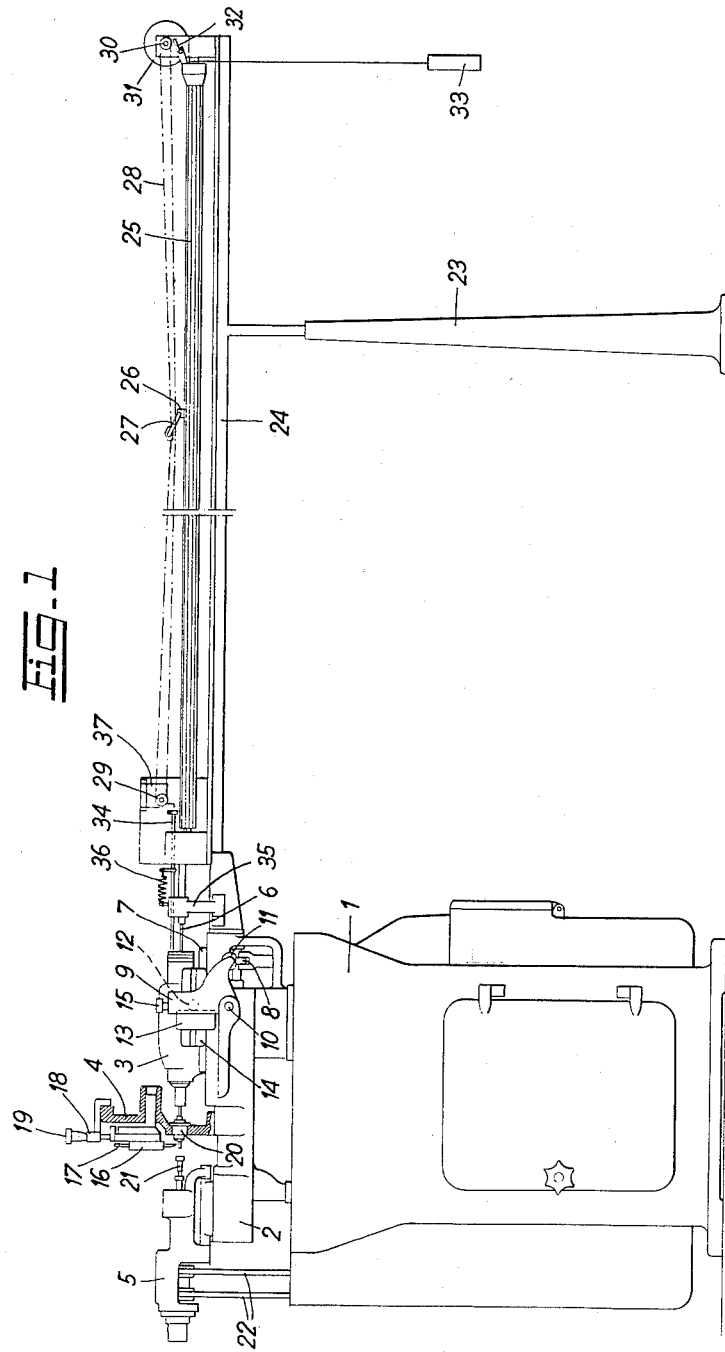
FIG. 1 is a general and simplified elevational view of the lathe to which a mechanism according to the invention is associated.

The lathe represented in FIG. 1 comprises a stand 1 in which the chief motor of the lathe is mounted, said motor driving the head stock 3 and every tool of the lathe by means known in the art. The stand 1 carries a framework 2 on which the head stock 3, a support 4 and an auxiliary apparatus 5 are mounted. The head stock 3 comprises a spindle driven in rotation from the chief motor of the lathe by means of a belt (not shown) passing through the framework 2 and set on a pulley (not shown) fixed to said spindle for rotary movements. The spindle itself comprises a chuck capable of gripping a feed or stock bar 6 so as to drive said bar in rotation and to move it in axial direction. To ensure this last motion the head stock 3 is mounted on an axial slide 7 of the framework 2 and it is set under the action of a very strong return spring urging said head stock backward i.e. towards the right in FIG. 1. The forward motion of the head stock 3 is controlled by a cam-shaft extending in parallel with the lathe on the backside thereof. To actuate the head stock 3 this cam-shaft carries a cam (not shown) cooperating with a lever 8 pivoting around an axis parallel to the lathe's axis, said lever extending from the rear side of the framework 2 to the front side thereof. A crank lever 9 located on the front side of the lathe is pivotally mounted on a trunnion 10 and this crank lever is set under the action of lever 8. At one of its ends this lever 8 carries a finger which always remains in contact with said cam and at its other end said lever is in contact with a roller 11 mounted for rotary motions at the end of one arm of lever 9. The other arm of this lever 9 carries a pin 12 against which a plate 13 fixed to the body member of the head stock is permanently bearing under the action of the head stock return spring. To set exactly the two extreme positions of the head stock 3 the body member of the latter carries a slide 14 on which the plate 13 is mounted. Moreover the lever 9 carries a regulating screw 15 which permits of adjusting the position of pin 12 along the corresponding crank lever arm so as to set the length of the axial displacement of the head stock.

The support 4 mounted on framework 2 carries slides in which blocks 16 are mounted. Tools 17 are fixed to the latter so that they extend fanwise substantially in a radial direction with respect to the bar 6. The blocks 16 are moved along their slides upward by means of strong return springs (not shown) and downward by means of levers 18 carrying micrometric regulating screws 19 enabling an exact adjustment of the end position of tools 17. To avoid bending of the bar portion extending in front of the head stock 3 when the tools 17 come in working position, the support 4 carries a sleeve 20 which can be fixed or can comprise a moving part and the bar 6 is carried in this sleeve.

The fanwise arranged tools 17 thus enable machining the side faces of the work pieces at the end of bar 6. While these tools are only moving forward and then backward radially with respect to the bar, the head stock 3 drives the latter in rotation and moves it forward under said tools through the sleeve 20.

While tools 17 enable machining the lateral faces of the work pieces at the end of bar 6 further tools carried by the auxiliary apparatus 5 enable machining operations coaxially to said pieces from the front end thereof. The tools of apparatus 5 can be drills, borers, taps or die stocks as one of which is shown at 21. Each of these tools is mounted in a rotary spindle of apparatus 5 which carries a movable element carrying all the spindles of said apparatus. This movable element is arranged so that it can bring every spindle successively into the head stock axis. Said element of apparatus 5 can therefore either be a rocker or a revolver drum. When one of the tools of apparatus 5 must come in working position, a cam (not shown) carried by the cam-shaft mounted behind the framework 2 first moves the spindle of this tool into the head stock axis. Another cam of said camshaft moves then a lever which urges the spindle being now coaxial to the head stock toward the work piece. Like tools 17 the tools of apparatus 5 successively come in working position in accordance with a pre-determined cycle for every work piece. One tool of apparatus 5 and one tool 17 obviously can work at the same time. The tools of apparatus 5 can be held immobile since bar 6 is driven in rotation by the head stock 3. They can however also be driven in rotation for instance by means of the belts 22 either in the same direction or in the other direction as bar 6.

At the end of the operation cycle of tools 17 and of the tools of apparatus 5 one of the tools 17 is moved across the bar axis to cut the work piece which has just been machined at the end of this bar. After its cutting operation this tool 17 remains in its foremost position until the lathe is ready for beginning a new operation cycle. Before this, the head stock chuck, which came in its foremost position, opens and the head stock 3 moves backward under the action of its return spring through a path having a length exactly equal to that of the work pieces. When this head stock 3 has come in its rearmost position its chuck closes and grips bar 6. The lathe is then ready for machining a new work piece. It suffices therefore that the cutting tool 17, which was still in working position, moves out of the path of bar 6 to enable the head stock 3 moving this bar forward through the sleeve 20 so as to set the foremost end thereof into the operating field of tools 17 and of the tools of apparatus 5.

Since the bars 6 are relatively long with respect to their diameter a guiding and feeding device is associated to the lathe described as shown in FIG. 1. This guiding and feeding device is mounted on a pillar 23. It comprises a framework 24, the front end of which is carried by the framework 2 of the lathe. A revolver drum or elongated carrier means 25 is pivotally mounted on this framework 24. This drum comprises a plurality of guiding tubes 25a, each of which may contain a feed bar, said guiding tubes thus forming a magazine. The tube 25a of drum 25 which is in the upmost position of this drum is also located coaxially to head stock 3 and it guides and carries the bar 6 on which the lathe is just working. The guiding and feeding device described furthermore comprises a pusher 26 in each tube of the said drum. Each of these pushers 26 is constituted by a rod 26a extending within one of the tubes 25a of drum 25 and by a plate 26b extending across a longitudinal slot 25' of said tubes. A feeding means or member 27 is connected to the plate 26b of the pusher 26 which is carried by the tube being in the upmost position of drum 25, and this member 27 urges said pusher against the rear end of bar 6. To avoid any backward motion of said bar together with the head stock 3 at the end of an operation cycle of the lathe and to maintain said bar in contact with the cutting tool, the pusher 26 must exert a sufficient thrust on said bar toward the left in FIG. 1. The member 27 therefore is carried by an endless chain or driving means 28 mounted on a pair of chain wheels 29, 30 located at the front end and at the rear end, respectively, of said guiding device. This chain 28 is always driven in the same direction by means of a servo-motor 31 which is preferably constituted by a small asynchronous motor having a great frequency drift (almost 20 percent). This motor of a well known type thus exerts a relatively strong thrust on the chain 28 when the latter is to be moved. Moreover this motor can remain at rest without any damage during relatively long periods without breaking its energizing circuit. The motor 31 thus drives the chain 28 as soon as the pusher 26 enables member 27 moving toward the left in FIG. 1, i.e. as soon as the head stock is moving forward. In other words as long as bar 6 is in working position the pusher 26 always bears with a predetermined force against this bar. When the latter has been machined entirely, the member 27 passes around wheel 29 and the motor 31 starts then pulling the pusher 26 backward until it comes in a rearmost position described hereinafter. At that moment the member 27 leaves the pusher and passes around wheel 30 while the member 27a actuates the releasing lever 32 which enables the drum 25 moving one step forward under the action of a weight 33 in a manner described hereinafter. After this motion of drum 25 the next tube thereof comes then in the upmost position and the driving member 27 catches the pusher of this new tube when the motor 31 has carried said member around wheel 30 and urges it forward again toward the left of FIG. 1.

Although the motor 31 is exerting a relatively great driving couple on member 27, this couple does however not suffice to remove from the sleeve 20 the remaining stock bar portion, which cannot be machined furthermore, when the chain 28 starts pulling the member 27 backward after said member has been carried around wheel 29. As described in detail hereinafter the head stock 3 helps the servomotor 31 when the remaining stock bar portions must be removed from the sleeve 20. The lathe comprises therefore a sliding rod 34 shiftably mounted in a support 35 fixed to the framework 2. A return spring 36 provided between the support 35 and the rod 34 maintains the latter in contact with the rear face of a shoulder of the head stock body member. That means that the rod 34 follows the axial displacements of the head stock 3. A device 37 disclosed hereinafter in detail is arranged so as to transmit the backward motions of rod 34 to the pusher 26 at the moment at which member 27 starts pulling this pusher backward i.e. at the moment at which this pusher has to remove the bar 6 from sleeve 20.

The bar portions removed in the manner described from sleeve 20 and from head stock 3 are brought at the rear end of the corresponding tube of drum 25 where they are remaining since the following forward motion of member 27 drives another pusher with a new bar.

When all the bars of drum 25 have been machined the pushers of each of these tubes are then in their rearmost position each with a remaining bar portion which cannot be machined furthermore. The lathe must then be stopped and these remaining bar portions have to be replaced manually by new bars in order to enable the lathe working again in an entirely automatic manner during a relatively long period.

Figure 2:
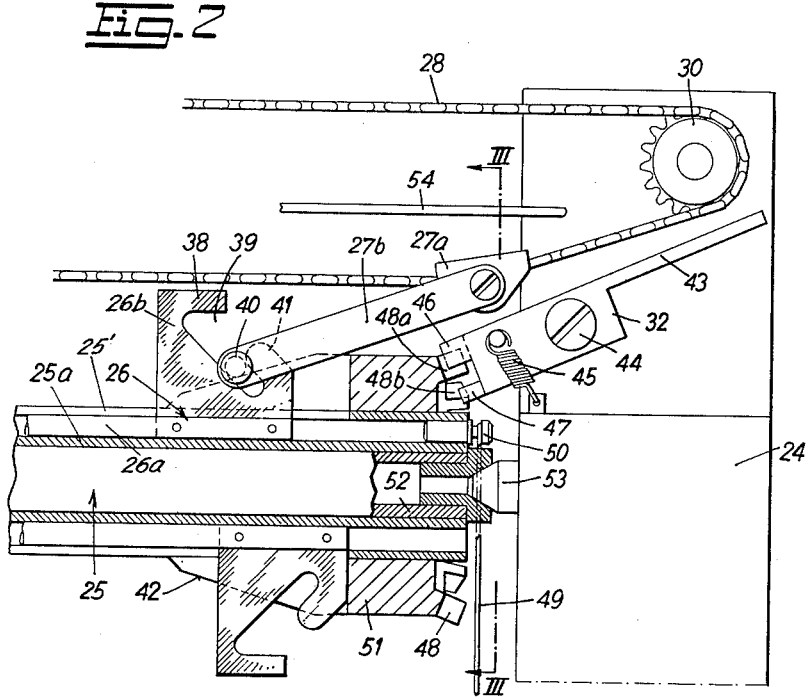
FIG. 2 is a view on a greater scale of the rear portion of said feeding mechanism.
Figure 3:
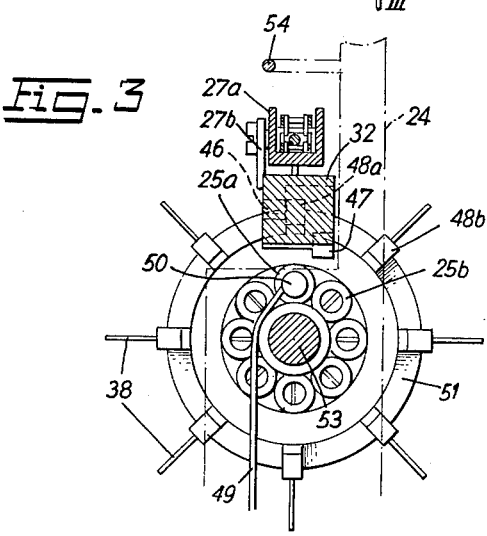
FIG. 3 is a cross section along line III—III of FIG. 2.

The rotary motion step by step of drum 25 is ensured by members and means represented in detail at FIGS. 2 and 3 in which the pusher 26 of the guiding tube 25a which is in the upmost position of drum 25 coaxial to the lathe's head stock, is being pulled back toward its rearmost position by the arm 27b jointed to the member 27a fixed to the endless chain 28. Before it arrives in the position represented in the drawings the pusher 26 has been driven forward by the arm or feeding means 27b which moved therefore along the upper portion of chain 28. During that motion the arm 27b carrying a pin 40 drove the pusher 26 by means of said pin which was engaged under the nose 38 of the pusher plate 26b formed by the cutout 39 thereof. After the element 27a has been carried around chain wheel 29, the pin 40 falls in the lower area of the cutout 39 and it comes thus behind ear 41 of pusher plate 26b behind which it remains caught, all the way through the member 27a is moving along the lower portion of chain 28 until it arrives in the position represented in FIG. 2 in which the pin 40 carried by arm 27b just engages the inclined camming surface 42 of a radial flange formed on a ring 51 set with force fit around the tubes of drum 25. For this purpose ring 51 is oriented around drum 25 in such a manner that every flange portion of said ring is in the immediate vicinity of one of the longitudinal tube slots through which the pusher plates are extending.

While sliding on the camming surface 42 the pin 40 is positively disengaged from ear 41 until it may pass over said ear and move out of cutout 39. At that moment the pusher 26 has reached the rear end of the longitudinal slot of the corresponding drum tube, which is just coinciding with the front end face of ring 51 as shown in FIG. 2.

Once the feeding means disclosed have left the pusher 26, they approach the chain wheel 30 round which member 27a will be carried along to come then on the upper portion of chain 28 thus moving then forward again.

Before it runs round wheel 30 this member or actuating means 27a comes however in contact with a tail portion 43 of lever 32 and it causes this lever to rock clockwise round its fixing screw 44 against the action of a return spring 45. During this motion a tooth 46 of lever 32 moves out of a toothing 48 formed on the rear face of ring 51 fixed on to the drum 25 and the tooth 47 of lever 32 is entering said toothing. FIG. 3 shows in particular that the weight or turning means 33, which is attached by means of a thread 49 to a gudgeon 50 engaged in tube 25a of drum 25, tends to drive said drum counter-clockwise in FIG. 3 because thread 49 is passing round an end piece 52 set into the center portion of drum 25 to serve as pivoting means of the latter by its cooperation with a trunnion 53 fixed to framework 24. The weight 33 thus holds tooth 48a of ring 51 in abutting engagement with tooth 46 of lever 32 all the way through pusher of tube 25a moves from its rearmost position toward its foremost position, while the lathe is working on stock bar 6 guided by said tube, and then comes back to its rearmost position once said bar has been worked out.

When lever 32 oscillates under the action of member 27a its tooth 47 enters the gap comprised between teeth 48a and 48b of ring 51 before the tooth 46 of lever 32 releases tooth 48a of said ring.

It will be observed that the lever 32 is placed in such a position with respect to the travelling path of member 27a that this member may oscillate said lever so far around its fixing screw that tooth 46 thereof will once release the tooth 48a of ring 51. As soon as said tooth is released, the drum 25 jumps half a step forward under the action of weight 33, until tooth 48b of ring 51 comes in abutting engagement with tooth 47 of lever 32. When member 27a releases then lever 32 and moves round wheel 30, the tooth 46 of this lever moves back into the gap comprised between teeth 48a and 48b of ring 51 and tooth 47 is progressively moving out of said gap until it finally releases tooth 48b which then jumps against tooth 46 of lever 32 under the action of weight 33.

After the complete oscillation described above of lever 32 the drum 25 has moved one step forward and its tube 25b has come at the place of tube 25a. When member 27a is moving forward along the upper portion of chain 28, the gudgeon 40 of arm 27b is engaging the nose 38 of the pusher plate 26b to drive said pusher and the stock bar of tube 25b forward until the front portion of said rod comes in the working field of the lathe's tools. The lever 32 cooperating with the teeth of the revolver drum 25 constitutes therefore escapement means permitting step by step turning movement of the drum under the influence of the weight 33 between a plurality of consecutive positions in which the guide means or tubes 25a of the drum are respectively in feeding position aligned with the head stock 3.

The mechanism represented in the drawings also comprises a guiding rod 54 mounted on the framework 24 and located at such a place with respect to the travelling path of arm 27b that the latter is held in a predetermined lateral position at the moment at which it starts moving forward and cannot pass by the pusher without catching the latter.

Although one embodiment of this invention has been described in detail hereabove, it will be understood that various changes in the shape, sizes and arrangement of parts could be resorted to within the scope of the appended claims without departing from the spirit of the invention or sacrificing the advantages thereof.

I claim:

1. In a feeding mechanism of the character described, in combination, support means; elongated carrier means including a plurality of guiding means in parallel arrangement for carrying and guiding a plurality of members respectively movable along said guiding means, said elongated carrier means being mounted on said support means for step by step movement in a direction transverse to said guiding means between a plurality of consecutive positions in which said plurality of guiding means are consecutively located in a feeding position aligned with a feeding path; moving means for moving said elongated carrier means step by step between said plurality of consecutive positions; feeding means adapted to engage the member which is guided by a guiding means located in said feeding position and to move said member along said feeding path in one direction while guided by the respective guiding means; driving means for moving said feeding means engaging the member in that guiding means which is located in said feeding position along said feeding path from an initial position located at one end of said guiding means to an end position and along a return path part of which is located outside said feeding path back to its initial position; and actuating means carried by said driving means for actuating said moving means for moving said carrier means from one into the next of said consecutive positions while said feeding means is moved by said driving means along that portion of its return path which is located outside of said feeding path.

2. In a feeding mechanism of the character described, in combination, support means; elongated drum means including a plurality of guiding means arranged angularly displaced from and substantially parallel to each other for carrying and guiding a plurality of members respectively movable along said guiding means, said elongated drum means being mounted on said support means for turning movement about its axis between a plurality of angularly displaced positions in which said plurality of guiding means are consecutively located in a feeding position aligned with a feeding path; moving means for moving said elongated drum means step by step between said plurality of angularly displaced consecutive positions; feeding means adapted to engage the member which is guided by a guiding means located in said feeding position and to move said member along said feeding path in one direction while guided by the respective guiding means; driving means for moving said feeding means engaging the member in that guiding means which is located in said feeding position along said feeding path from an initial position located at one end of said guiding means to an end position and along a return path part of which is located outside said feeding path back to its initial position; and actuating means carried by said driving means for actuating said moving means for turning said drum means from one into the next of said angularly displaced consecutive positions while said feeding means is moved by said driving means along that portion of its return path which is located outside of said feeding path.

3. In a feeding mechanism of the character described, in combination, support means; elongated drum means including a plurality of guiding means arranged angularly displaced from and substantially parallel to each other for carrying and guiding a plurality of stock bars along said guiding means, said elongated drum means being mounted on said support means for turning movement about its axis between a plurality of angularly displaced positions in which said plurality of guiding means and the stock bars respectively guided thereby are consecutively located in a feeding position aligned with a feeding path; moving means for moving said elongated drum means step by step between said plurality of angularly displaced consecutive positions; a plurality of pusher means respectively located in and guided by said guiding means for respectively pushing the stock bars located in said guided means in a feeding direction; feeding means adapted to engage the pusher means which is guided by a guiding means located in said feeding position to move said pusher means and the stock bar engaged thereby along said feeding path in said feeding direction while said pusher means and the stock bar are guided by the respective guiding means; driving means for moving said feeding means engaging the pusher means which is in the guiding means located in said feeding position along said feeding path from an initial position located at one end of said guiding means to an end position and along a return path part of which is located outside said feeding path back to its initial position; and mechanical actuating means carried by said driving means for actuating said moving means for turning said drum means from one into the next of said angularly displaced consecutive positions while said feeding means is moved by said driving means along that portion of its return path which is located outside of said feeding path.

4. In a feeding mechanism of the character described, in combination, support means; elongated drum means including a plurality of guiding means arranged angularly displaced from and substantially parallel to each other for carrying and guiding a plurality of stock bars along said guiding means, said elongated drum means being mounted on said support means for turning movement about its axis between a plurality of angularly displaced positions in which said plurality of guiding means and the stock bars respectively guided thereby are consecutively located in a feeding position aligned with a feeding path; moving means for moving said elongated drum means step by step between said plurality of angularly displaced consecutive positions, said moving means including turning means connected to said elongated drum means and tending to turn the latter in one direction about its axis, escapement means cooperating with said drum means and being movable between a rest position in which said escapement means hold said drum means against the action of the turning means in a position in which one of said guiding means is located in said feeding position and a release position in which said escapement means permits said turning means to turn said drum means from one to the next of said angularly displaced positions; a plurality of pusher means respectively located in and guided by said guiding means for respectively pushing the stock bars located in said guided means in a feeding direction; feeding means adapted to engage the pusher means which is guided by a guiding means located in said feeding position to move said pusher means and the stock bar engaged thereby alon gsaid feeding path in said feeding direction while said pusher means and the stock bar are guided by the respective guiding means; driving means for moving said feeding means engaging the pusher means which is in the guiding means located in said feeding position along said feeding path from an initial position located at one end of said guiding means to an end position and along a return path part of which is located outside said feeding path back to its initial position; and mechanical actuating means carried by said driving means for moving said escapement means from its rest position to its release position so as to permit said turning means to turn said drum means from one into the next of said angularly displaced consecutive positions while said feeding means is moved by said driving means along that portion of its return path which is located outside of said feeding path.

5. An arrangement as defined in claim 1 in which said driving means includes an endless chain extending parallel to said feeding path and means for driving said chain in one direction.

6. An arrangement as defined in claim 4 in which said turning means includes a weight operatively connected to said drum means for turning the latter in one direction about its axis.

7. An arrangement as defined in claim 6 in which said weight is connected to said drum means by an elongated flexible member wound at least in part about a cylindrical portion of said drum means coaxial with said axis.

8. An arrangement as defined in claim 4 in which said escapement means comprises an oscillating lever mounted on said support means in a position to be engaged by said mechanical actuating means while said feeding means is moved by said driving means along that portion of its return path which is located outside of said feeding path to tilt said lever from a rest position to a releasing position, and spring means connected to said lever and tending to maintain the latter in its rest position.

9. An arrangement as defined in claim 8 in which said drum means is provided with a plurality of angularly displaced teeth and in which one end of said oscillating lever cooperates with said teeth to permit that turning means to turn said drum means from one to the next of the angularly displaced position thereof whenever said oscillating lever is moved by said actuating means from its rest to its releasing position.

10. An arrangement as defined in claim 4 in which said driving means includes an endless chain extending parallel to said feeding path and means for driving said chain in one direction, in which said feeding means includes an elongated arm connected at one end thereof to said chain, and in which said mechanical actuating means is constituted by a member fastened to the chain substantially at the same location as said one end of said arm.

References Cited in the file of this patent

UNITED STATES PATENTS

| | | |
|---|---|---|
| 458,681 | Durie et al. | Sept. 1, 1891 |
| 2,108,274 | Tautz et al. | Feb. 15, 1938 |
| 2,343,914 | Lloyd | Mar. 14, 1944 |
| 2,746,128 | Barron et al. | May 22, 1956 |